Figure 1:
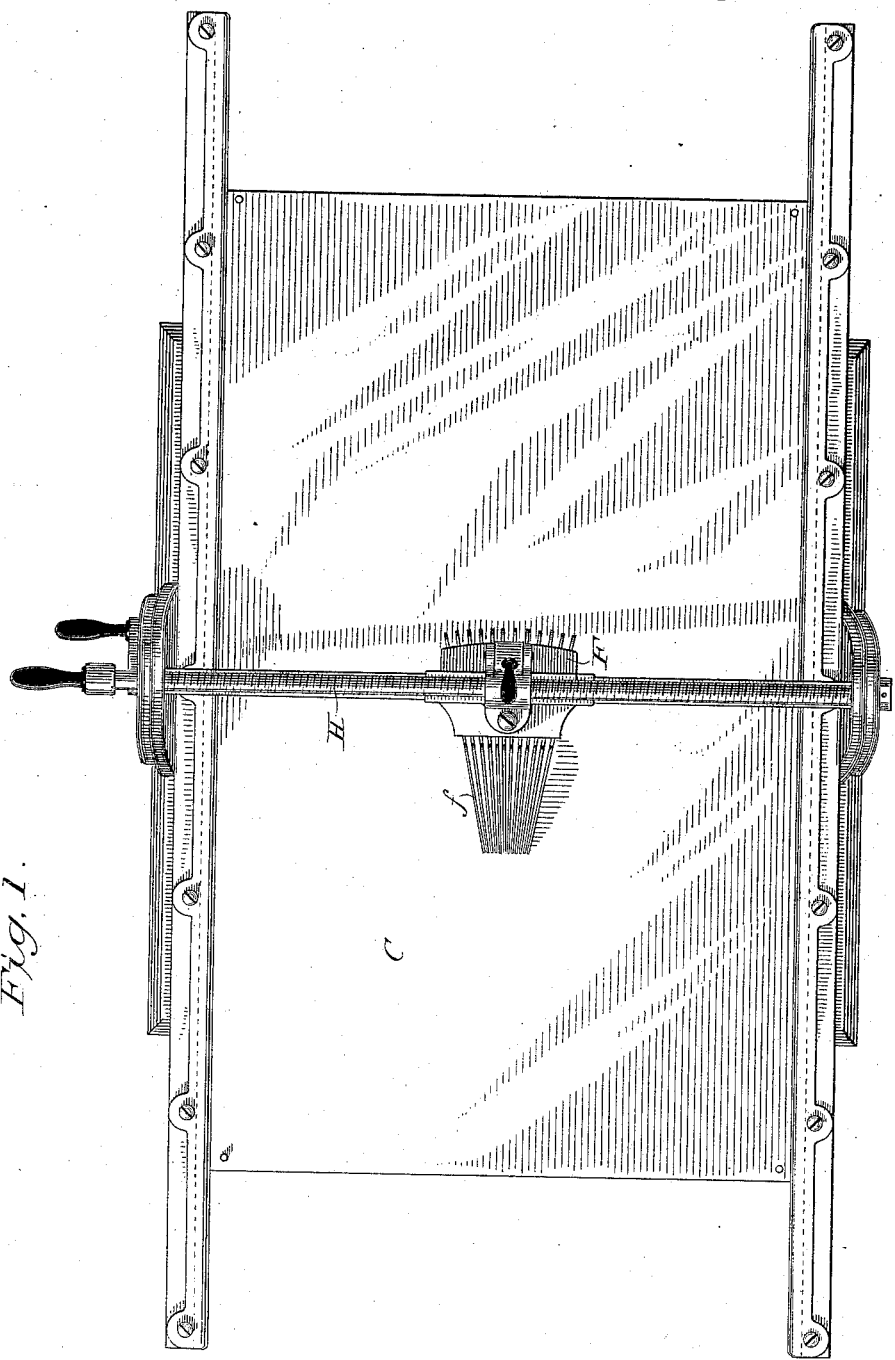

(No Model.)
10 Sheets—Sheet 1.

P. B. DELANY.
SYNCHRONOUS TELEGRAPHY FOR FAC SIMILE TRANSMISSION.

No. 316,754

Patented Apr. 28, 1885.

WITNESSES
Wm A. Skinkle
Geo W. Young

INVENTOR
Patrick B. Delany
By his Attorneys
Baldwin Hopkins & Payson (No Model.) 10 Sheets—Sheet 4.
P. B. DELANY.
SYNCHRONOUS TELEGRAPHY FOR FAC SIMILE TRANSMISSION.
No. 316,754. Patented Apr. 28, 1885.

WITNESSES
Wm. A. Skinkle
Geo. W. Young

INVENTOR
Patrick B. Delany
By his Attorneys
Baldwin, Hopkins & Payton (No Model.) 10 Sheets—Sheet 5.
P. B. DELANY.
SYNCHRONOUS TELEGRAPHY FOR FAC SIMILE TRANSMISSION.
No. 316,754. Patented Apr. 28, 1885.
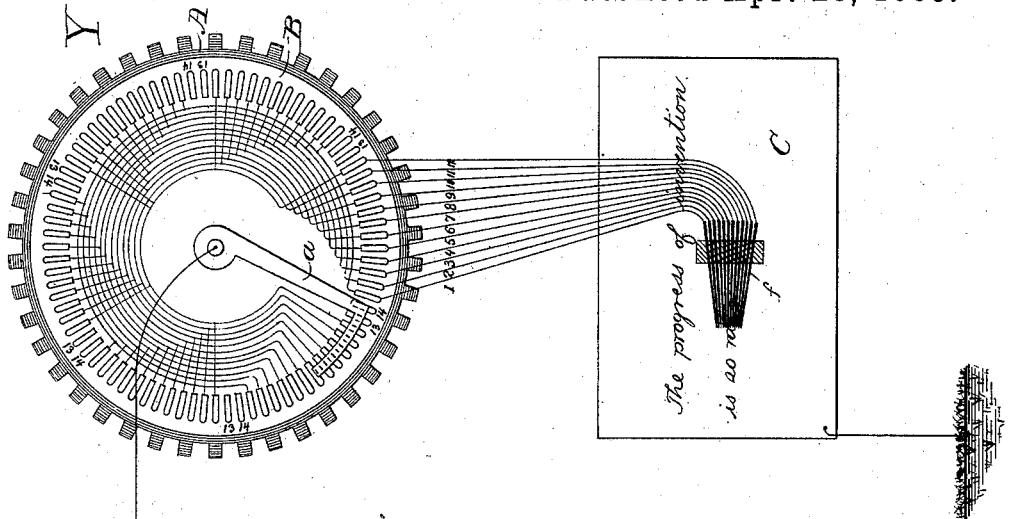
Fig. 8.
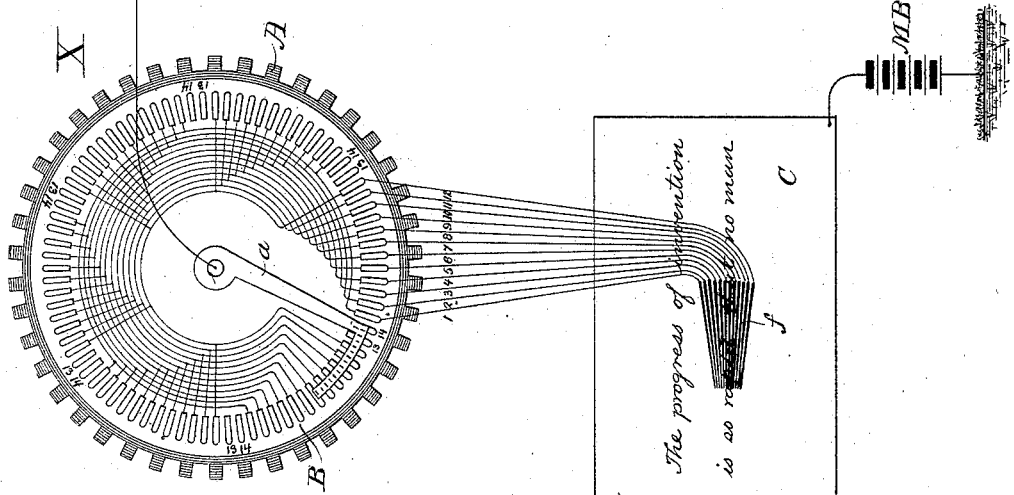
WITNESSES
Wm A. Skinkle
Geo W Young
INVENTOR
Patrick B. Delany
By his Attorneys
Baldwin, Hopkins & Peyton (No Model.) 10 Sheets—Sheet 6.
P. B. DELANY.
SYNCHRONOUS TELEGRAPHY FOR FAC SIMILE TRANSMISSION.
No. 316,754. Patented Apr. 28, 1885.
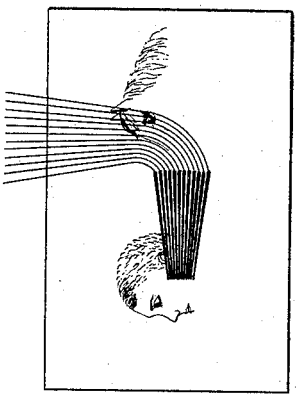
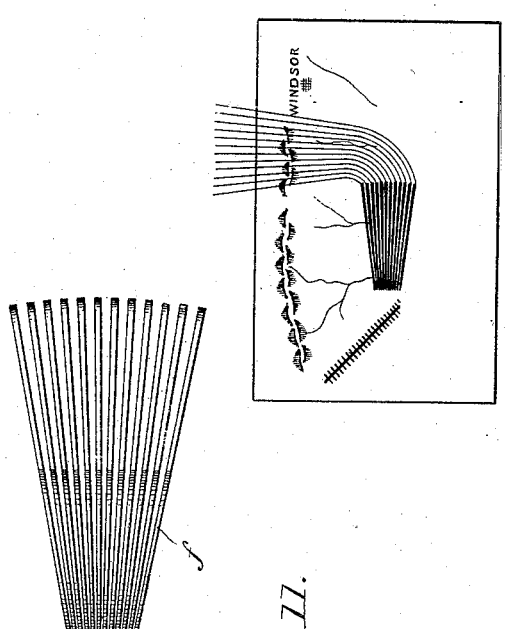
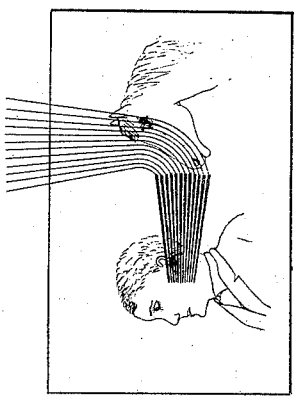
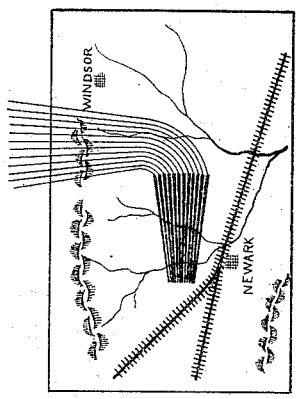
Fig. 9.　　　Fig. 10.　　　Fig. 11.
WITNESSES
Wm A. Skinkle.
Geo. W. Young.
INVENTOR
Patrick B. Delany
By his Attorneys
Baldwin, Hopkins & Peyton (No Model.)  10 Sheets—Sheet 7.
P. B. DELANY.
SYNCHRONOUS TELEGRAPHY FOR FAC SIMILE TRANSMISSION.
No. 316,754. Patented Apr. 28, 1885.
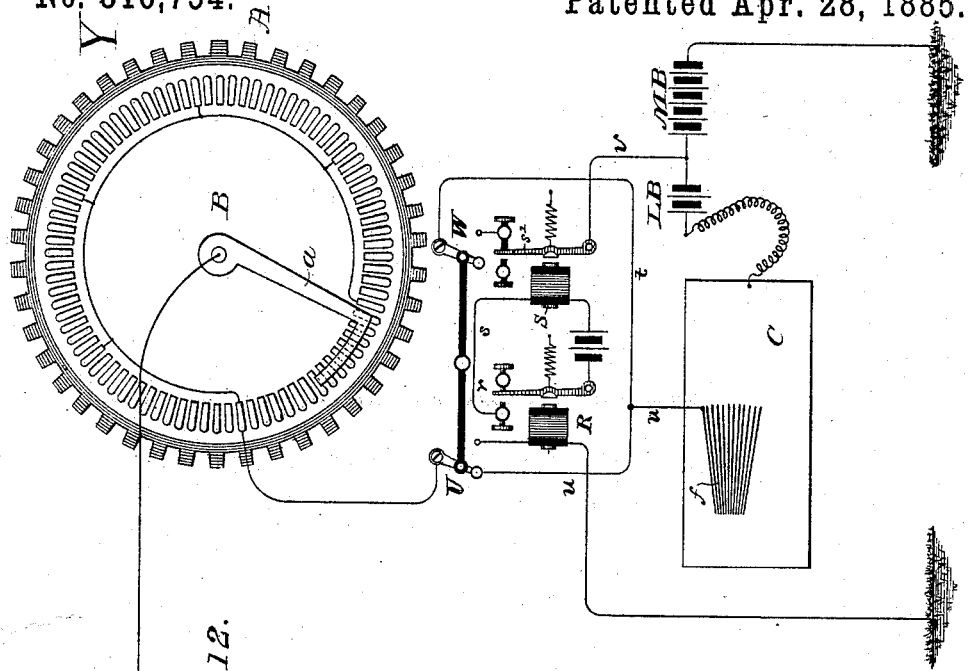
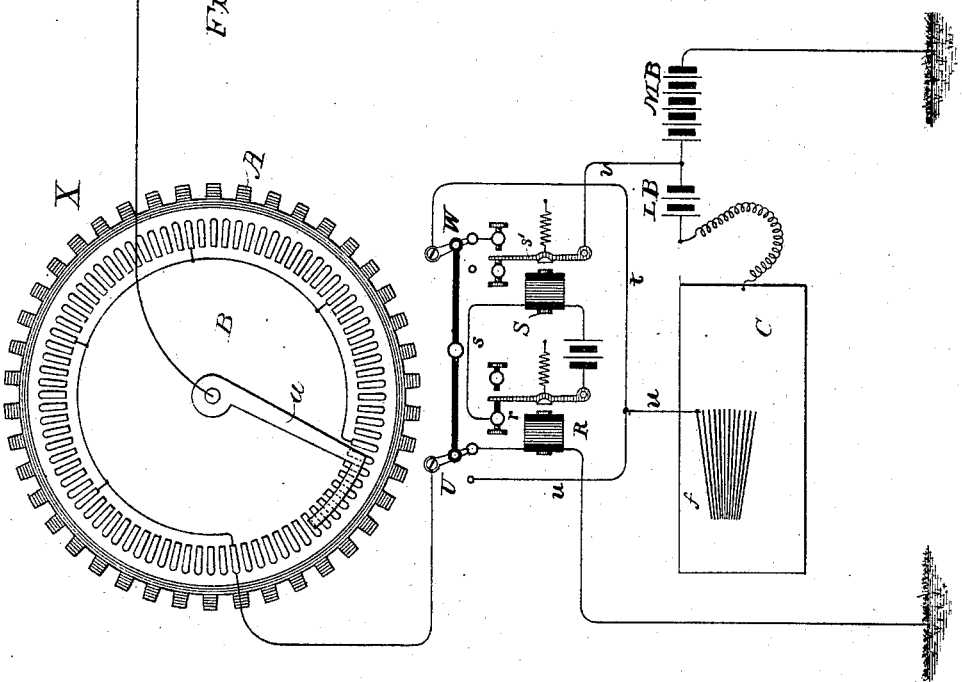
Fig. 12.
WITNESSES
Wm. A. Skinkle.
Geo. W. Young.
INVENTOR
Patrick B. Delany.
By his Attorneys
Baldwin, Hopkins & Peyton.

(No Model.) 10 Sheets—Sheet 8.
P. B. DELANY.
SYNCHRONOUS TELEGRAPHY FOR FAC SIMILE TRANSMISSION.
No. 316,754. Patented Apr. 28, 1885.
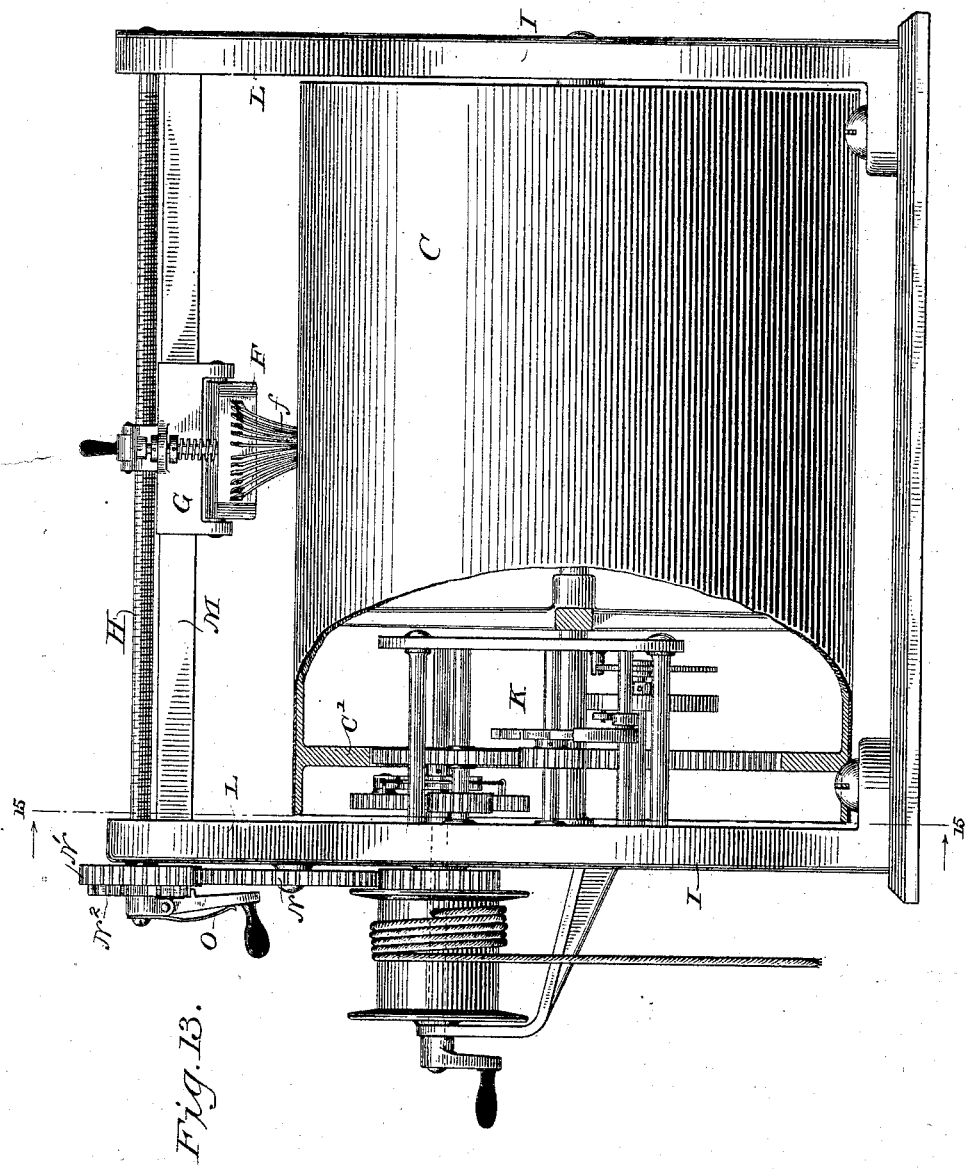
WITNESSES
Wm A. Skinkle
Geo. W. Young
INVENTOR
Patrick B. Delany.
By his Attorneys
Baldwin, Hopkins & Payton (No Model.)  10 Sheets—Sheet 9.

P. B. DELANY.
SYNCHRONOUS TELEGRAPHY FOR FAC SIMILE TRANSMISSION.

No. 316,754.  Patented Apr. 28, 1885.

WITNESSES
Wm A. Skinkle
Geo. W. Young

INVENTOR
Patrick B. Delany.

By his Attorneys
Baldwin, Hopkins & Peyton.

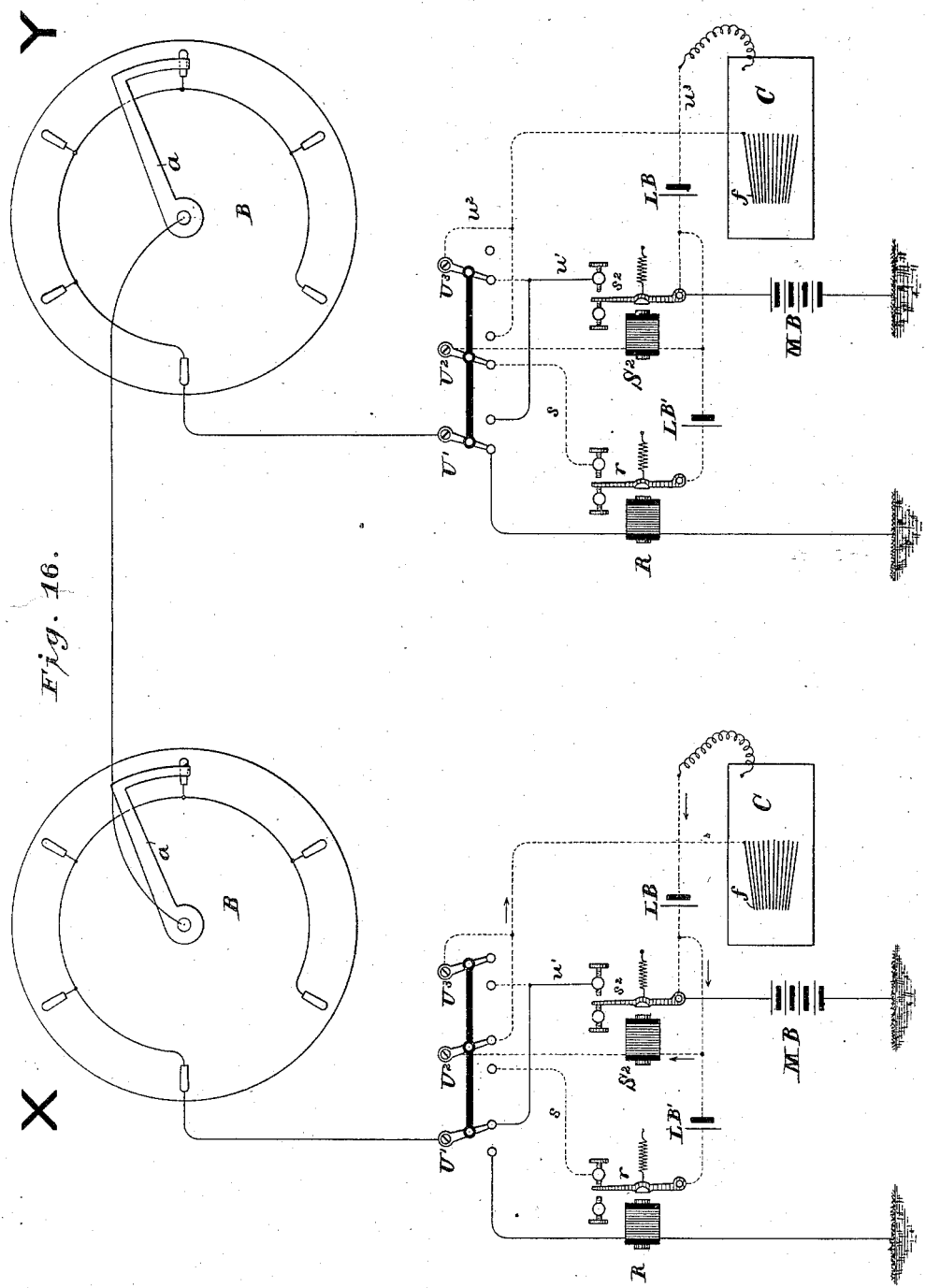

UNITED STATES PATENT OFFICE.

PATRICK B. DELANY, OF NEW YORK, N. Y., ASSIGNOR TO THE STANDARD MULTIPLEX TELEGRAPH COMPANY, OF SAME PLACE.

SYNCHRONOUS TELEGRAPHY FOR FAC-SIMILE TRANSMISSION.

SPECIFICATION forming part of Letters Patent No. 316,754, dated April 28, 1885.

Application filed June 18, 1884. (No model.)

*To all whom it may concern:*

Be it known that I, PATRICK B. DELANY, of the city, county, and State of New York, have invented certain new and useful Improvements in Fac-Simile or Autographic Telegraphy, of which the following is a specification.

In the well-known systems of Bakewell, Caselli, and others fac-simile transmission has been accomplished by a single stylus at each station, which either traversed a stationary surface or under which the transmitting or receiving surface was caused to move. This method is, however, slow in operation, and is more or less imperfect in its results. The system of Bonelli was designed to overcome these last-mentioned objections to the autographic systems in use, and, as is well known, Bonelli employed a series or comb of styluses or fingers at each station, and a cable of conductors equal in number to the fingers at each station, the corresponding fingers at the stations being connected by an independent wire. This system produced very satisfactory results on short lines; but the number of wires employed made the system so expensive as to render it impracticable on long lines, and the induction in the cable was so great that the efficiency of the momentary impulses sent through the cable was very much reduced. For the reasons above stated, and perhaps others, the ingenious autographic systems which have heretofore been invented have not been practically successful, and their use has been very limited. Under my improved system herein described and illustrated I employ combs containing twelve fingers (more or less) at each station in connection with a single main-line wire. I am therefore able to transmit manuscript, maps, and pictures with rapidity and accuracy.

In sundry Letters Patent of the United States granted to me October 9, 1883, I have shown systems of synchronous movements which I prefer to employ in my present invention, though, obviously, so far as the systems of synchronous correction are concerned, other systems than those disclosed in said patents may be employed in connection with my invention. In those patents I have illustrated tables of insulated contacts arranged in a circular series, over which synchronously-actuated circuit-completers are caused to traverse. Some of said contacts, taken at regular intervals in the series, are devoted to maintaining the synchronous movements of the apparatus at the opposite ends of the main line. The remainder of the contacts in the series are shown as connected in independent groups—that is, say, six contacts (more or less) taken at regular intervals around the table are shown as connected in an independent circuit—and others of the contacts are similarly connected in other independent circuits. As set forth in these patents, the main-line circuit will be completed from one of said circuits at one station to the circuit connected to the corresponding contacts at the other station whenever the circuit-completers rest upon the corresponding contacts of the two circuits.

The independent circuit, therefore, through a set of contacts at one station and through the corresponding contacts at the other station, may be independently utilized for telegraphic or other purposes. In those patents the main line is shown as divided into six independent circuits, though, of course, it is capable of a different division, either into a greater or less number of circuits. Under the organization in my present invention I divide the main line, according to the systems disclosed in the patents referred to, into twelve independent circuits, in each of which a stylus or finger is placed at each station for fac-simile transmission, as will now be described in detail.

Figure 2:
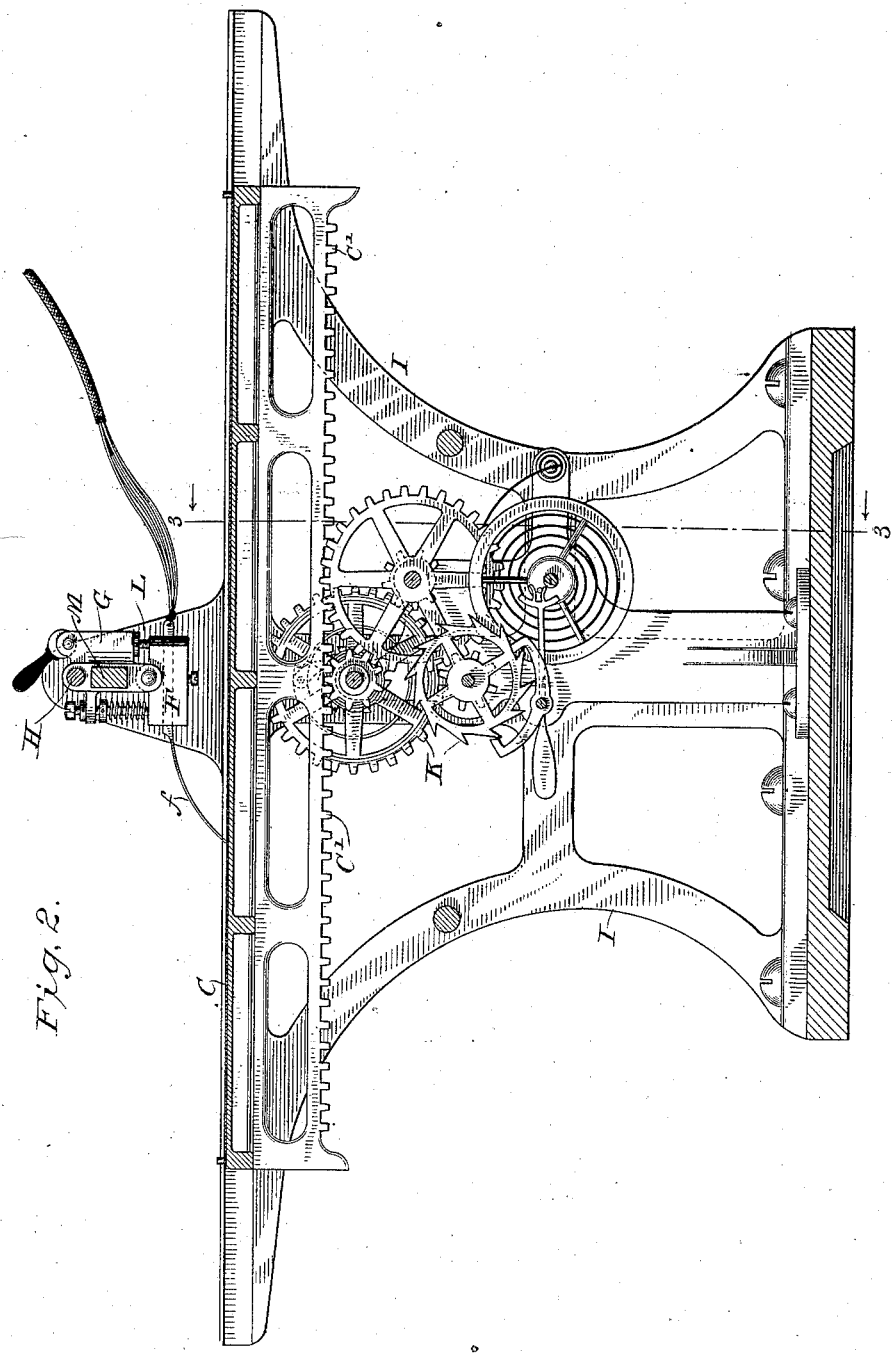
Figure 3:
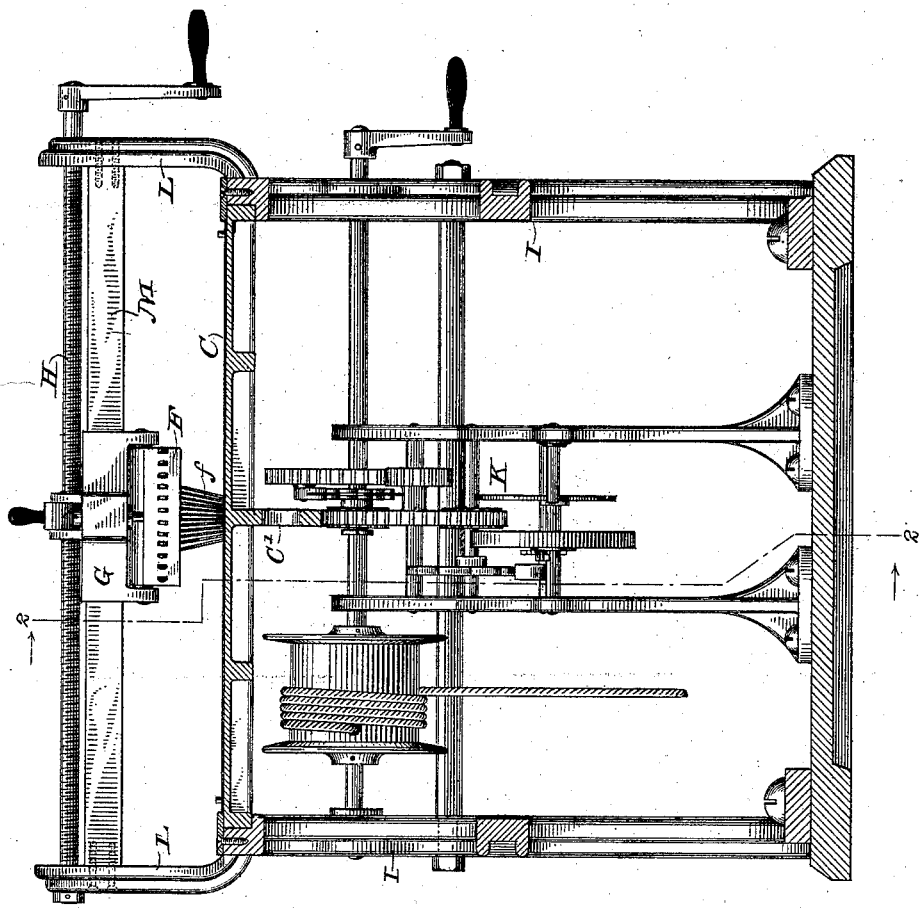
Figure 15:
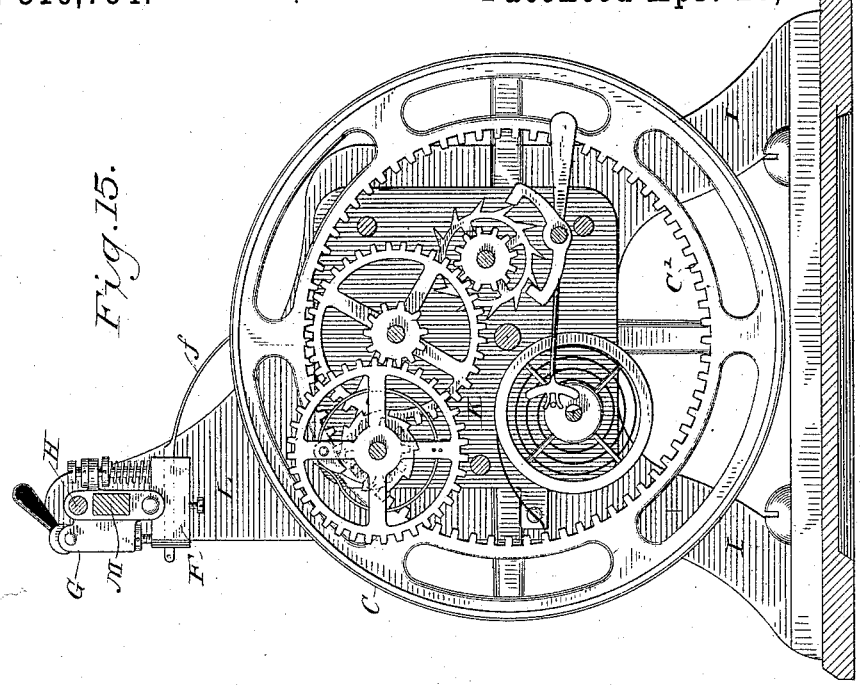
Figure 14:
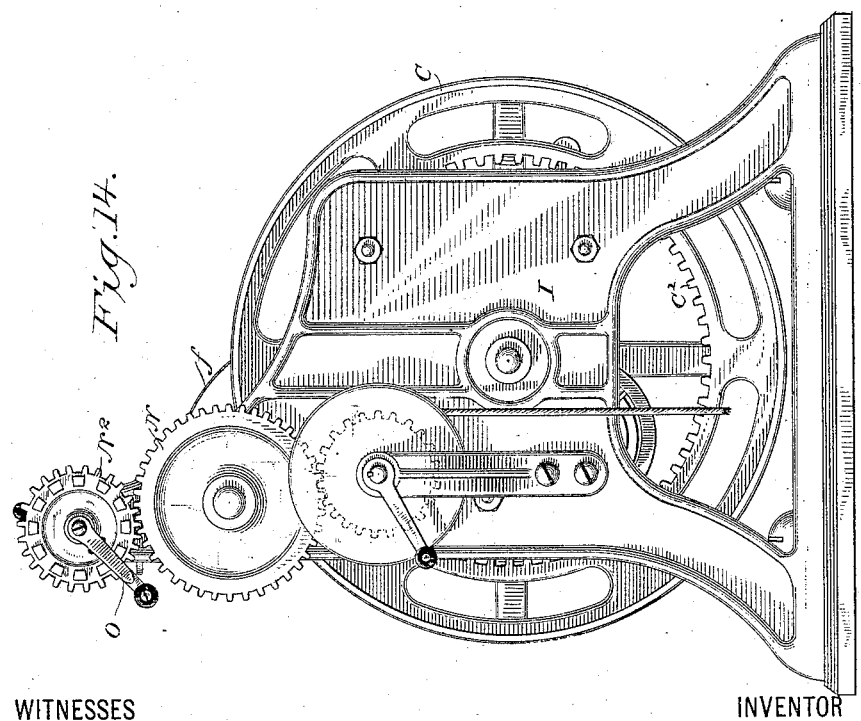

In the accompanying drawings, Figure 1 is a plan view, Fig. 2 a side elevation, and Fig. 3 an end view, of my machine. Figs. 4, 5, 6, 7 illustrate the details of construction, with the insulating block or head in which the contact-fingers are mounted. Fig. 8 is a diagram view showing two connected stations, and illustrating the principle of automatic transmission. Figs. 9, 10, 11 are different views illustrating the transmission of manuscript, pictures, and maps. Fig. 12 is a diagram view in which a relay is employed to effect the fac-simile reproduction by a local circuit. Fig. 13 is a side view of the machine in which a rotating cylinder is employed. Fig. 14 is an end view of such a machine. Fig. 15 is a transverse section of the same on the line 15 15 of Fig. 13, looking in the direction of the arrows; and Fig. 16 is a diagram view illustrating another manner of transmission.

Referring now especially to Fig 8, A is the rotating disk, which may be rotated as described in my prior patents referred to, and $a$ is the trailing circuit-completer, which is mounted on the spindle of the disk A. B is the table of insulated contacts, on which, in this instance, eighty-four insulated contacts are shown arranged in a circular series. These contacts may be said to be arranged in six sub-series, each containing fourteen contacts. It will be observed that the contacts numbered 13 and 14 are unconnected in any manner, and it is proposed to utilize them for the synchronous correction of the apparatus, as described in the patents above referred to. Twelve contacts—one from each group—are connected together, and to a line marked 1 at station Y. The corresponding contacts at station X are similarly connected to a line marked 1. Each of these lines is connected with an insulated stylus or finger, $f$. Twelve other contacts at each station are similarly connected to lines marked 2, which are also connected to insulated fingers marked $f$, and the remaining contacts are similarly connected in circuits marked 3, 4, 5, 6, 7, 8, 9, 10, 11, and 12, which are also connected with insulated fingers $f$. As the synchronously-moving trailing fingers $a$ traverse the table of contacts, they rest upon corresponding contacts at the same time. When, therefore, they rest upon contacts connected with the circuits marked 1, there is a completion of the circuit from the insulated finger $f$ in circuit 1 at one of the stations to the corresponding finger at the other station. When the trailing fingers move onto the contacts with which the circuits marked 2 are connected, the main-line circuit is completed between those two circuits, and so on. If the trailing fingers are therefore rotated, say, three times a second, the circuit will be completed between the corresponding lines of the two stations eighteen times per second. This gives a number of impulses which permits of working at high speed, as will presently be described. The fingers $f$ are arranged in a "comb," as it is termed, being mounted in close proximity to each other in a block of vulcanite or other insulating material, as will be described hereinafter. Their points are in close proximity to each other, as will be clearly seen from the drawings, and rest upon plates C, which are caused to move under the fingers at approximately equal rates of speed by suitable clockwork or other mechanism, several forms of which are shown and hereinafter described. A battery, MB, is shown as connected with the metallic plate C at station X, which we will call the "transmitting-station," while at station Y the metallic plate C is connected with the ground. If a message be written on the plate C at the transmitting-station with insulating-fluid, and a sheet of Bain paper be laid on the plate C at station Y wherever the ends of the fingers $f$ at the transmitting-station rest directly upon the plate, the circuit from the battery MB at the transmitting-station will be independently completed through each of the lines from one to twelve, say, eighteen times per second through the fingers at the receiving-station to the ground. The effect of this will be to produce a discoloration of the paper. Whenever one or more fingers at the transmitting-station, however, rest upon the insulating-ink as the plate C passes under the fingers, that circuit or circuits will be broken, so that no discoloration of the paper will take place under the corresponding fingers at the receiving-station. It will therefore be obvious that when the comb of fingers $f$ is drawn over the line of writing on the plate C at the transmitting-station that line or writing will be automatically reproduced at the receiving-station, being represented by light lines surrounded by a dark ground produced by the chemical decomposition on the Bain paper. The completions of the circuit through each of the lines 1 2 3 4 5 6 7 8 9 10 11 12 occurs at such frequent intervals that the effect is precisely the same as if the corresponding fingers at the two stations were each connected by independent main lines, as in the system of Bonelli above referred to. By the use of a broad comb of fingers a wide space may be covered in each traverse of the plates C, so that a high speed of transmission may be obtained.

In the diagram view, Fig. 8, to which sole reference has been had up to this time, the received words are indicated at station Y by black lines on a white ground; but this is done merely for convenience of illustration. The representation would be different, as above mentioned, with the battery arranged as shown in the figure. It is, however, entirely practicable, and is so well understood as not to need illustration or particular description, to arrange the transmitting-battery according to the plan of either Caselli or Bonelli, so that the battery will be shunted at the transmitting-station when the fingers rest upon the conducting-surface, but will be sent to line when the fingers rest upon the non-conducting parts of the surface, and with that arrangement of battery the transmitted matter will be represented at the receiving-station by the dark lines caused by chemical decomposition.

Figure 5:
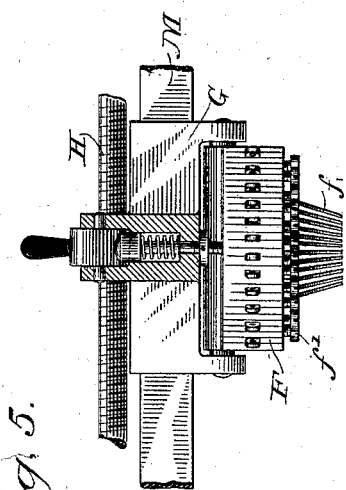
Figure 6:
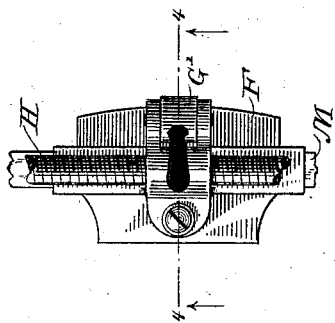
Figure 4:
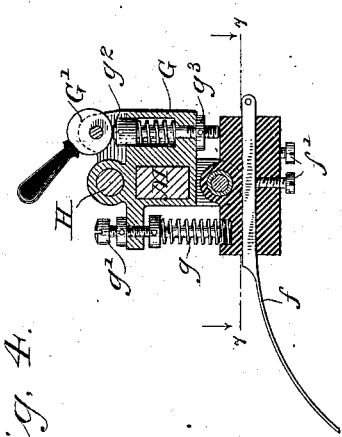
Figure 7:
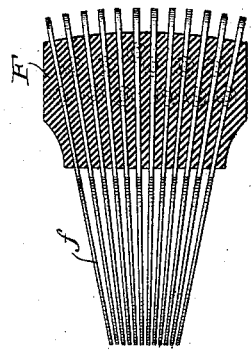

Fig. 9 represents a picture in process of transmission; Fig. 11, a map; and Fig. 10 illustrates the fingers of a comb, full sized, and of a width sufficient to cover three lines of manuscript in one traverse. The fingers $f$ are mounted in a block, F, of vulcanite or other suitable insulating material, as shown in Figs. 4, 5, and 7. The fingers are passed through slots or apertures in the block, and are held firmly and adjustably by set-screws $f'$. The block F is pivoted in a frame, G, which works on a screw-threaded shaft, H. The ends of the fingers or styluses are normally pressed downward by the coil-spring $g$, which is adjusted by a screw-bolt, $g'$, which passes through the frame G. On the other side of the bearing of the block F is a bolt, $g^2$, which is normally pressed upwardly, its upward motion being limited by a collar, $g^3$, which abuts against the frame G. This bolt serves as a back stop to limit the depression of the ends of the fingers. The bolt $g^2$ may, however, be pressed down by a cam, G', so as to elevate the ends of the fingers and maintain them so against the depresssing tendency of the spring $g$. Thus when the plate C (shown in Fig. 8) has reached the end of its movement the cam G' is turned so as to elevate the fingers to hold them out of contact with the plate while it is retracted. The lateral position of the comb relatively to the plate C is changed by rotating the shaft H, which causes the frame G to travel laterally on it until the comb is brought into proper position. The fingers are then depressed again, and the plates are started on another movement.

Referring to Figs. 1, 2, and 3, which illustrate an organization which may be adapted for use in connection with a reciprocating bedplate, C, I represents the frame of the instrument, and K any ordinary clock-work, by means of which the bed-plate C is moved endwise, the plate being driven by a rack, C$^t$, in which a pinion of the clock-work engages. The clock-work may be driven by a spring, as illustrated in Fig. 2, or by a weight, as shown in Fig. 3. In either event the movement of the plates at the two stations can be made approximately equal. Two lugs or vertical standards, L, rise from each side of the frame about midway of its length. The screw-shaft H has its bearings in these lugs. The frame G, which carries the comb, travels on a string-bar, M, which connects the standards L L. When, therefore, the shaft H is rotated, the frame G is caused to travel laterally on the string-bar.

As the invention is not dependent upon any special form of mechanism for accomplishing these purposes, and as this class of machinery is common and well understood, and is fully illustrated in the drawings, further explanation of it is deemed unnecessary, as the structure and mode of operation will be apparent to those skilled in the art.

Instead of employing a reciprocating bedplate, C, a rotating cylinder may be used. Such a machine is illustrated in Figs. 13, 14, and 15. The structure, however, is identical in principle with that illustrated in Figs. 1, 2, and 3, and needs no further description. In this arrangement, however, a gear-wheel, N, driven from the clock-train, gears with a wheel, N', which is loose on the screw-shaft H. The wheel N' is normally locked on the shaft H by a spring-catch, O, which is pivoted in a collar on the end of the shaft, and engages with the teeth of a gear-wheel, N$^2$, fast on the shaft. When the wheel N' is locked on the shaft H, so as to cause its rotation when the cylinder is rotated, the comb will be moved laterally on the cylinder as the cylinder revolves, the gearing and the pitch of the thread on the screw-shaft being regulated to produce the desired amount of motion. This, however, is the plan adopted in the well-known Bakewell system, and therefore needs no further elaboration here.

In order to adjust the comb independently of the rotation of the cylinder, the latch O, which is provided with a suitable handle, is pulled out of engagement with the teeth of the wheel N$^2$ and the shaft H rotated to bring the comb into the desired position.

In the diagram Fig. 12 I have shown an arrangement for obtaining the fac-simile reproduction of the transmitted matter by means of a local battery.

To avoid the unnecessary multiplication of lines in the drawing, only one stylus $f$ in the comb is shown as connected in its circuit. In this diagram the apparatus is shown as transmitting from Y to X. In the arrangement shown in this figure the combined power of the local battery LB and the main battery MB passes through the plate C, finger $f$, line $u$, and switch U to the table of contacts and main line, for it will be perceived that the branch of the local circuit $t$ and the branch $v$ are both open, the former at the switch W and the latter at the back contact of the armature $s'$. The transmitting-batteries at Y are therefore constantly thrown upon the main line, subject to the rapid interruptions of, say, eighteen per second, caused by the rotation of the trailing fingers.

At station X, which is shown in condition for reception, the switch U is connected with the coil of the relay R, while the switch W is in connection with the back contact of the armature $s'$ of the electro-magnet S. The armature $r$ at X is drawn to its front contact by the current on the main line, and the momentary interruptions due to the traverse of the rotating fingers $a$ are not of sufficient duration to permit the armature to leave that contact long enough to operate the armature $s'$, as is presently described. The armature $r$ of the relay R, being therefore practically constantly drawn against its front stop, completes the local circuit $s$ of the magnet S, and draws its armature $s'$ against its front contact. If, now, there is a sheet of Bain paper on the plate C at station X, and a message be written in insulating-ink on the plate C at station Y, so long as the main current is permitted to traverse the line, as above described, no effect will be produced at station X; but when one or more of the fingers $f$ at station Y come in contact with the insulating-surface of the plate C the current from the battery at Y is interrupted for a sufficient length of time to permit the armature $r$ of the relay R at station X to leave its front contact, interrupt the circuit $s$, and permit the armature $s'$ to fall against its back stop. In that condition the circuit of the local battery LB will be completed as follows: from battery through the plate C, finger or fingers, $f$, line $u\,t$, switch W, armature $s'$, line $v$, to opposite pole of the battery, and a discoloration will be produced in the Bain paper. Each circuit being equipped with apparatus such as just described, it will be obvious that the characters on the plate C at the transmitting-station will be reproduced on the sensitive paper at the receiving-station by discolorations on the paper. This arrangement, however, can only be used where the interruptions of the main line caused by the rotation of the fingers occur with such rapidity as not to permit the armature $r$ to leave its front contact sufficiently long to operate the armature $s'$. I prefer, however, the arrangement shown in Fig. 16, as by it sharper and more distinct characters may be produced at the receiving-station. In the arrangement shown in this figure the transmitting-battery is only sent into the line when a character or portion of a character is to be transmitted. In this arrangement I employ a three-part switch and two relays.

The apparatus is shown in position for transmission from X to Y. In this figure, as in the former figures, we have only shown one group of contacts and their connections at each station.

The transmitting-battery MB is connected with the armature $s^2$ of the magnet $S^2$. The front stop of this armature, against which it is drawn by the attraction of the magnet $S^2$, is insulated. The rear stop is, however, connected by a line, $u'$, with the switch U', thence to the table of contacts and line. The circuit of the local battery LB is normally closed and runs in the direction indicated by the arrow, passing through the coil of the magnet $S^2$ to the switch $U^2$, finger $f$, plate C, back to opposite pole of the battery. The armature $s^2$ is therefore drawn against its front stop whenever the circuit between the finger $f$ and the plate C is uninterrupted. If the finger, however, runs upon the insulating-surface representing the message to be transmitted, this local will be interrupted, the armature $s^2$ will go to its back stop, and the main battery will pass to line through the line $u'$ and switch U'. At station Y the switch is connected with the line passing through the coil of the receiving-relay R. When the transmitted impulse sent from station X, as just described, is received at Y, the armature $r$ of the relay R is drawn from its back stop, thus breaking the circuit of the local battery LB'. This circuit normally passes from one pole of the battery through the armature $r$, back contact, line $s$, switch $U^2$, coil of the magnet $S^2$, to the opposite pole of the battery LB'. When this local, therefore, is interrupted by the reception of an impulse, as described, the circuit $s$ is broken, and the armature $s^2$ of the magnet $S^2$ falls against its back stop. This completes the circuit of the local battery LB through the armature $s^2$, its back stop, line $u'$, switch $U^3$, line $u^2$, to finger $f$, plate C, line $u^3$, to opposite pole of the battery. If there is a sheet of Bain paper, therefore, on the plate C, a discoloration is produced. Of course, by merely reversing the positions of the switches U' $U^2$ $U^3$, which are controlled by a common rock-bar of insulating material at each station, messages may be transmitted from Y to X. I prefer this arrangement, for the reason that the line is not constantly occupied by the current, but impulses for actual transmission only are sent into the line.

The distinguishing characteristic of my invention which gives my system the capacity for high speed of working, and at the same time permits its use on an economical basis, is the fact that a large number of independent circuits in which the combs are connected are made or completed through a common main-line wire. So far as the preparation of the message to be transmitted is concerned, or so far as the material or manner of reproduction of the characters transmitted is concerned, they form no part of my invention.

Various ways of printing or representing a character, map, or message to be transmitted upon a metal plate or sheet of tin-foil or other material are well known in the art. So, also, other paper or material or systems of reproduction other than that involved in the use of Bain paper may be used. So far, also, as the broad principle of my invention is concerned, other synchronous methods than those described in my patents before referred to may be employed to effect the required subdivision of the circuit, as has been described, and the apparatus at the two stations which are to be maintained in synchronism may either be driven electrically or in any other suitable way.

In order to eliminate statical and other disturbances from the main line, which on long lines might interfere with the effective working of the apparatus, discharge-contacts placed between the insulated contacts on the table and connected with the ground may be employed, as fully set forth and described in Letters Patent No. 286,273, granted to me October 9, 1883.

I claim as my invention—

1. In a fac-simile or autographic system, the combination of a single main-line conductor, a series of corresponding terminal lines at each end of the main line, the circuits of the pairs of corresponding terminal lines being successively completed through the common main line, and a contact finger or stylus connected with each of said lines.

2. The combination, substantially as set forth, of a main line, a series of insulated contacts at each end of the main line, synchronously-actuated circuit-completers which traverse said contacts and momentarily place them in communication with the main line, a series of independent lines at each end of the main line, each of said lines being connected with one or more of the contacts on the table of contacts, the corresponding lines at the two stations being connected with corresponding contacts, as described, and the fingers or styluses for automatic transmission connected in said lines.

3. The combination, substantially as set forth, of a main line, a series of insulated contacts at each end of the main line, synchronously-actuated circuit-completers which traverse said contacts and momentarily place them in communication with the main line, some of said contacts being devoted to maintaining the synchronous movement of the apparatus, a number of independent lines at each station, among which the remainder of the contacts are distributed, the corresponding lines at the two stations being connected with corresponding contacts, and the fingers or styluses for automatic transmission connected in said lines.

4. The combination, substantially as set forth, of a main line, a series of insulated contacts at each end of the main line, synchronously-actuated circuit-completers which traverse said contacts and momentarily place them in communication with the main line, a number of independent lines, in each of which some of said contacts are connected, the corresponding lines at the two stations being connected with corresponding contacts, fac-simile telegraphic transmitting and receiving devices, contact-fingers connected in each of said lines, a relay in each of said lines, and a local circuit which is completed through each of said fingers in response to the action of the relay to reproduce the transmitted characters at the receiving-station, as described.

5. In a fac-simile telegraphic system, the combination of a single main-line conductor, a series of corresponding terminal lines at each end of the main line, the circuit of each pair of corresponding terminal lines being completed through the common main line, mechanism, substantially such as described, by which the circuits between said corresponding terminals are successively independently completed, electric devices for automatic transmission, substantially such as described, by which an impulse of electricity is sent into the line only when a character or portion of a character is being transmitted, and receiving devices for receiving and recording said impulses.

6. The combination, substantially as set forth, of a main line, a series of insulated contacts at each end of the main line, synchronously-actuated circuit-completers which traverse said contacts and momentarily place them in communication with the main line, a series of independent lines at each end of the main line, each of said independent lines being connected with one or more of the contacts on the table of contacts, the corresponding lines at the two stations being connected with corresponding contacts, the contact fingers or styluses for automatic transmission connected in said lines, devices, substantially such as described, for sending a transmitting-impulse into the line only when a character or portion of a character is to be transmitted, and receiving devices.

7. The combination, substantially as set forth, of a main line, a series of insulated contacts at each end of the main line, synchronously-actuated circuit-completers which traverse said contacts and momentarily place them in communication with the main line, a series of independent lines at each end of the main line, each of said lines being connected with one or more of the contacts on the table of contacts, the corresponding lines at the two stations being connected with corresponding contacts, the fingers or styluses connected in said lines, the plates C, over which the styluses traverse, the relays R and $S^2$, the main batteries, the local batteries, their circuits and connections, and the switches.

In testimony whereof I have hereunto subscribed my name.

PATRICK B. DELANY.

Witnesses:
SAML. A. FOSTER,
E. A. KELLOGG.